US008387775B2

(12) United States Patent
Mckeown et al.

(10) Patent No.: US 8,387,775 B2
(45) Date of Patent: Mar. 5, 2013

(54) EGG HANDLING SYSTEM

(75) Inventors: Matthew T. Mckeown, West Bloomingfield, MI (US); Carl Gene Cooper, Garden City, MI (US); Kyle Dewayne Becker, Westland, MI (US); Wayne William Kelley, Canton, MI (US); Richard Schneider, White Lake, MI (US)

(73) Assignees: Diamond Automations, Inc.; FPS Food Processing Systems, B.V., Re Nootdrop (NL)

( * ) Notice: Subject to any disclaimer, the term of this patent is extended or adjusted under 35 U.S.C. 154(b) by 321 days.

(21) Appl. No.: 12/555,149

(22) Filed: Sep. 8, 2009

(65) Prior Publication Data

US 2010/0059337 A1   Mar. 11, 2010

Related U.S. Application Data

(60) Provisional application No. 61/094,533, filed on Sep. 5, 2008, provisional application No. 61/118,020, filed on Nov. 26, 2008.

(51) Int. Cl.
*B65G 47/36* (2006.01)
*B65G 29/00* (2006.01)

(52) U.S. Cl. .............. 198/485.1; 198/469.1; 198/364; 198/482.1

(58) Field of Classification Search .......... None
See application file for complete search history.

(56) References Cited

U.S. PATENT DOCUMENTS

| | | | |
|---|---|---|---|
| 2,729,842 A * | 1/1956 | Stamos | 15/256.51 |
| 2,995,244 A * | 8/1961 | Albers | 209/134 |
| 3,447,176 A * | 6/1969 | Scheffer et al. | 15/3.11 |
| 4,036,355 A | 7/1977 | Valli et al. | |
| 4,230,071 A | 10/1980 | Phillips | |
| 4,360,099 A | 11/1982 | Niederer et al. | |
| 4,569,444 A * | 2/1986 | McEvoy et al. | 209/510 |
| 4,766,849 A | 8/1988 | Kawabata et al. | |
| 4,776,465 A * | 10/1988 | McEvoy et al. | 209/510 |
| 4,836,355 A | 6/1989 | Blanc | |
| 5,086,909 A | 2/1992 | Powell, Jr. | |
| 5,167,317 A | 12/1992 | van der Schoot et al. | |
| 5,168,977 A | 12/1992 | van Essen et al. | |
| 5,176,243 A | 1/1993 | Temming et al. | |

(Continued)

FOREIGN PATENT DOCUMENTS

| | | |
|---|---|---|
| EP | 0098733 A2 | 1/1984 |
| EP | 0114488 A2 | 8/1984 |

(Continued)

*Primary Examiner* — Kavel Singh
(74) *Attorney, Agent, or Firm* — Gifford, Krass, Sprinkle, Anderson & Citkowski, P.C.

(57) ABSTRACT

A transfer system for providing faster and increased volume processing of eggs having an overhead positioned egg conveyor. A rotating brush wheel positioned underneath the conveyor receives eggs and includes a first and second pluralities of bristles having, respectively, lesser and greater stiffness. An egg receiving reservoir exhibits a receiving lane positioned underneath and in alignment with the brush wheel for receiving and redirecting the eggs in a lane dedicated fashion to a subsequent egg handling operation. A plurality of spool bars are arranged in parallel extending and spaced apart fashion and defining a number of individual egg conveying lanes and each further include first and second spool bar portions secured in end-to-end fashion to establish an overall dimension. First and second drive supports are arranged at opposite ends of the spool bar portions, a third drive support arranged within the egg transfer mechanism and supporting opposing and intermediate engaging ends of each pair of spool bar portions. The intermediate drive support prevents sagging of the intermediate ends of the spool bar portions.

10 Claims, 13 Drawing Sheets

U.S. PATENT DOCUMENTS

| | | | |
|---|---|---|---|
| 5,483,872 A | 1/1996 | Nield | |
| 5,617,782 A | 4/1997 | Thomas | |
| 5,634,397 A | 6/1997 | Hutchinson et al. | |
| 5,636,726 A | 6/1997 | Nield | |
| 5,673,649 A | 10/1997 | Duecker et al. | |
| 5,749,453 A | 5/1998 | Doornekamp et al. | |
| 5,797,249 A * | 8/1998 | Hartness | 53/473 |
| 5,802,682 A | 9/1998 | Jourde et al. | |
| 5,819,383 A | 10/1998 | Jourde et al. | |
| 5,858,434 A | 1/1999 | Thomas | |
| 5,918,726 A | 7/1999 | Temmink | |
| 5,944,165 A | 8/1999 | Mannlein et al. | |
| 6,029,424 A | 2/2000 | McEvoy et al. | |
| 6,056,341 A | 5/2000 | Bliss | |
| 6,109,421 A | 8/2000 | Ross et al. | |
| 6,234,070 B1 | 5/2001 | Hutchison et al. | |
| 6,237,978 B1 | 5/2001 | Bliss | |
| 6,715,518 B2 * | 4/2004 | Finkowski et al. | 141/129 |
| 6,732,851 B2 | 5/2004 | Wienken | |
| 6,817,055 B1 | 11/2004 | Ekholm | |
| 6,821,353 B1 | 11/2004 | Kuhl | |
| 6,883,528 B2 | 4/2005 | Kuhl | |
| 6,964,331 B1 | 11/2005 | Kerr | |
| 7,237,668 B2 | 7/2007 | Gamberini | |
| 7,380,650 B2 | 6/2008 | Gamberini | |

FOREIGN PATENT DOCUMENTS

| | | |
|---|---|---|
| EP | 0847941 A1 | 6/1998 |
| EP | 0930235 A1 | 7/1999 |
| JP | 53023470 A | 3/1978 |
| JP | 61188080 A | 8/1986 |
| JP | 10188214 A | 7/1998 |
| JP | 2000006916 A | 1/2000 |
| JP | 2001014287 A | 1/2001 |
| JP | 2002053217 A | 2/2002 |
| JP | 2002220110 A | 8/2002 |
| JP | 2004194538 A | 7/2004 |
| JP | 2004321109 A | 11/2004 |
| JP | 2008013189 A | 1/2008 |
| KR | 200441595 Y1 | 8/2008 |
| NL | 1004777 C | 6/1998 |
| NL | 1006002 C | 11/1998 |

* cited by examiner

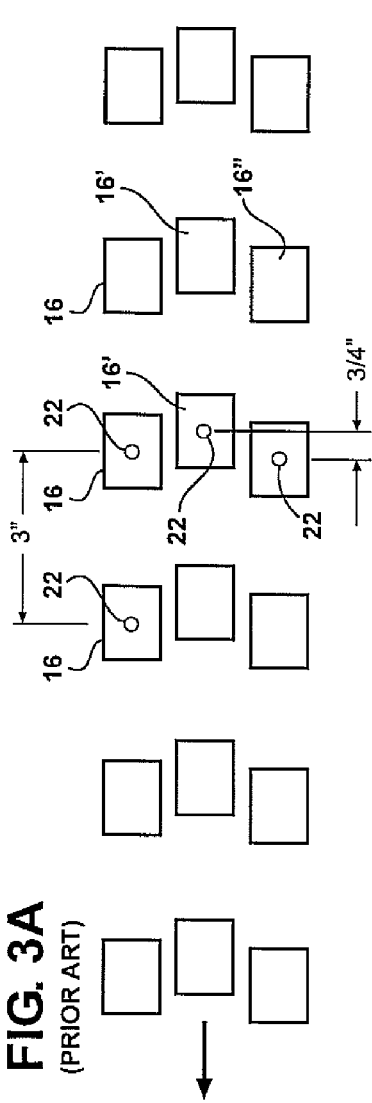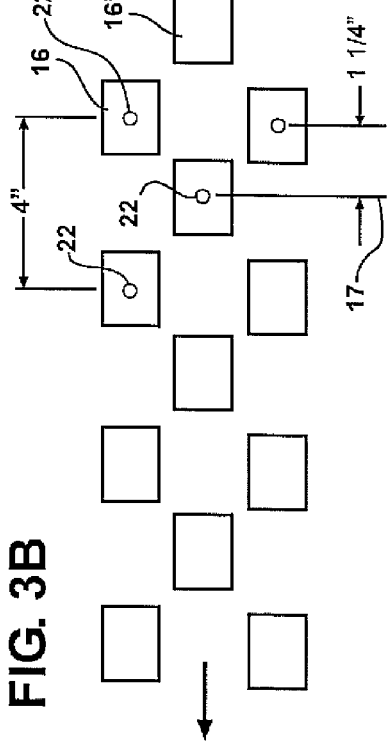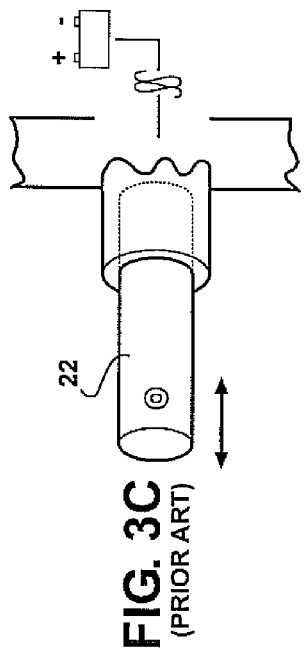
FIG. 3A (PRIOR ART)
FIG. 3B
FIG. 3C (PRIOR ART)

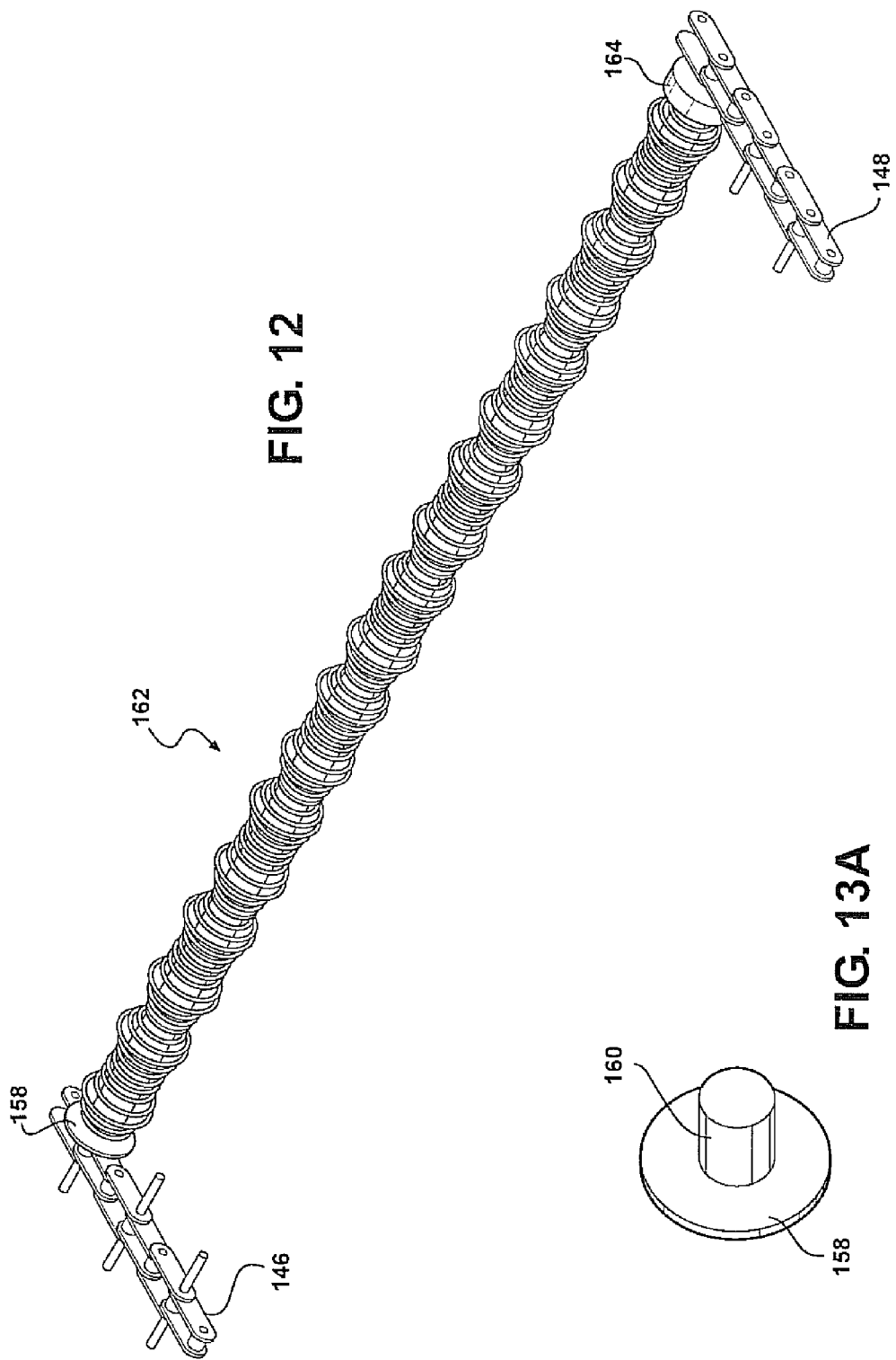
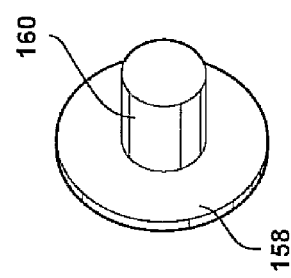

EGG HANDLING SYSTEM

CROSS REFERENCE TO RELATED APPLICATIONS

The present application claims the benefit of Provisional Patent Application Ser. No. 61/094,533 filed Sep. 5, 2008 and entitled "Egg Handling System", as well as Provisional Patent Application Ser. No. 61/118,020 filed Nov. 26, 2008 and entitled "Extended Length Conveyor Roller for Egg Transport Incorporated into an Egg Conveyor Mechanism".

FIELD OF THE INVENTION

The present invention discloses a transfer system for providing faster and increased volume processing (also known as throughput) of eggs. Specifically, the invention disclose a modification of prior art egg transfer systems, and by which both solenoid actuated plungers and underside fixed positioned brushes associated with an egg conveying component of the overall transfer system are widened, such as to 4" on center dimensions for the solenoid/plungers and corresponding 4" width of each subset brush roll, while associated conveying and egg release baskets positioned underneath the plungers are retained at a 3" on center spacing.

The invention includes an appropriate processor/controller component with associated software and which operates to track individual egg position from a preceding transfer/loading component interfacing with the egg basket conveyors. The programming of the controller is modified such that a designated drop location of a given egg carrying basket, relative to an underside located parallel packing line with which a selected pair of rotating brushes is associated, is modified by virtue of the controller providing an offset delay to the triggering of an associated selected solenoid/plunger.

In this fashion, the increased conveyor speed of the baskets, combined with the design disparity in the on center spacing established between the baskets on one hand and both the solenoid/plungers and underside rotating brushes on the other, is compensated by the programming component of the operating controller. In this fashion, egg drop is timed to occur at a point which guarantees proper drop trajectory of the egg, at a designated station location corresponding to a given one of a plurality of parallel packaging operations, at which point the egg is received between a pair of parallel and opposingly rotating brushes in a controlled fashion for subsequent delivery to a designated lane associated with an underside and crosswise extending reservoir for subsequent delivery at a second end to such as an egg packing operation.

The brush wheels include softer inner bristle tufts, with either or both outer end circumferences displaying stiffer outer bristle tufts and in order to receive and redirecting the eggs in a lane dedicated fashion to the underside reservoir. A plurality of lengthened spool bars are also incorporated at various communicating locations associated with the egg transfer assembly, including such as each of the inlet egg orienter, washer, drier and candler.

The spool bars are arranged in parallel extending and spaced apart fashion and define a number of individual egg conveying lanes. The spool bars each further include first and second spool bar portions secured in end-to-end fashion to establish an overall dimension. First and second drive supports are arranged at opposite ends of the spool bar portions, a third drive support arranged within the egg transfer mechanism and supporting opposing and intermediate engaging ends of each pair of spool bar portions. The intermediate drive support prevents sagging of the intermediate ends of the spool bar portions

DESCRIPTION OF THE PRIOR ART

The prior art is well documented with various kinds of egg transfer and conveying assemblies which include egg orienting, washing, drying, sorting and packaging operations incorporated into a single line conveying process, such as which is typically installed at an industrial egg farm operation. Referring to FIG. 14, with additional reference to FIG. 3A, a prior art egg transfer system is shown and includes is typically installed within an industrial egg production facility.

FIG. 14 shows, at an inlet end, an egg orienting subassembly 1 which typically interfaces with an existing item of equipment (not shown) associated with the facility and which delivers previously laid eggs to the orienting subassembly 1. The orienting subassembly 1 communicates the eggs in a desired manner to an egg washer subassembly 2, this further providing for cleaning of the eggs in order to remove contaminants and the like.

Following washing, the eggs progress from an outlet of the washer 2 to a leaker removal subassembly 3, the purpose for which being to inspect the eggs utilizing available technology (such as acoustic related) and in order to determine where eggs may be cracked and which may be leaking and which must be removed from the transfer process. Eggs determined to be acceptable by the leaker subassembly 3 are then successively conveyed to an egg dryer 4.

Upon exiting the dryer 4, the eggs proceed to a candler subassembly 5, this operating to rotate the eggs individually for overhead inspection by a dirt detection unit 6. Following dirt detection, the eggs are advanced to an egg transfer reservoir 7 which is operates to redirect the eggs from a typically greater number of parallel lanes to a smaller number of rows (typically three) of continuously advancing egg transfer baskets (subsequent reference being had to 15 in the detailed description below to FIG. 1 et seq.) which are incorporated into a crosswise extending and overhead conveyor 8. A control box is illustrated at 9 connected to the conveyor via wiring harness and in order to modify the performance parameters of the controller function. An underside located reservoir is further generally shown at 13 and typically includes a plurality of narrow, constant width lanes which receive eggs at a first end and transfer the eggs to a further end for packaging or the like.

Although not shown in detail, the transfer reservoir 7 includes the ability to determine a distinguishing operating parameter associated with each selected egg, such as individually weighing each egg and in order to determine a relative size. An associated controller records the parameter (such as the weight of each egg) and retains this information upon loading the specified egg into an identified pair of clasping arms defining a given basket.

With further reference to FIG. 3A, a solenoid/plunger array is shown according to the prior art and which is positioned in underside facing fashion at given locations along the overhead conveyor 8. Each array typically includes a plurality of egg release locations (up to six) associated with each of first, second and third rows. As will be further described in reference to the features of the present inventions, the illustrated plurality of egg release locations (identified by eighteen such release locations) corresponds to an underneath and crosswise extending parallel packing operation, each of which also includes a suitable pair of rotating brushes and proximately positioned reservoir and so that that, upon the controller identifying a correct egg for delivery to a given packaging operation, the basket is conveyed to the desired solenoid with subsequent triggering for egg drop.

FIG. 3A illustrates individual and linear extending rows of egg release locations including first row 16, second offset row 16' and third row 16" (aligned with first row 16). Each of the egg release locations includes an integrated solenoid which is in operative communication with the controller assembly and which, upon being energized, linearly extends a plunger 22 (see also prior art view of FIG. 3C which illustrates a power source for actuating a winding, this in turn contacting a metal portion of the plunger 22 so as to create an opposing force causing the selected plunger 22 to linearly displace for subsequent engagement with a release portion of a selected basket pair.

Of note, the prior art design of FIG. 3A illustrates each of the plurality of solenoid/plunger components being separated by a three inch on center spacing, this being consistent with an identical three inch on center spacing of both the underside conveyed baskets and the lower most rotating brushes (improved versions of which are illustrated and described throughout FIGS. 1, 2, 3B and 4-13 directed to the features of the present inventions). The second row 16' of egg release locations is spaced an offset distance (such as ¾") relative to the first and third rows 16 and 16", the reason for which being the variation in the contact location with the opposingly rotating brushes (i.e. the middle linear row of release locations delivering a varied egg trajectory which results in the egg traveling further and father before contacting the outer and opposing rotating edges of the brushes).

Given the solenoid/plungers, underside conveyed baskets and rotating brushes each exhibit an identical on center spacing, triggering of egg release at a given one of the parallel packing stations occurs at one aligning location between a sensor input coupling located along a side of the given operation (again identified as generally the three rows of release locations, with each row corresponding to a subset station). The programming of the controller is such that the any number of eggs, ranging from one up to six identified in FIG. 3A, can be simultaneously released at a given station/packaging operation, this depending upon the characteristics of the egg being conveyed by each basket and where the controller wishes it to be delivered.

The shortcoming of the prior art delivery system is that it is volume (or throughput) limited in that it cannot accommodate a desire to increase the volumetric throughput of eggs, this including a desire to redesign the other associated components (including orienter 1, washer 2, dryer 4 and candler 5, and in order to advance and drop eggs at the desired operation. This is in relevant part due to the fact that the controller mechanism is limited to releasing, simultaneously, an available number of eggs located at a given station and which fit into the desired parameters assigned to that given packaging operation (.e.g. that the eggs be of a certain weight and corresponding size).

The additional limitation of such a design is that, following the initial simultaneous solenoid triggered release of one or more eggs, the baskets must then be repositioned to a further assigned location (such as at a further station), at which a further egg (and coincidentally any other eggs associated with the given station which happen to meet the programmed parameters) may then be released in a further simultaneous drop. In summary, such a design incorporates fatal limitations preventing any meaningful increase or enhancement of processing speed or throughput of the egg transfer assembly given the limitations of the solenoid mechanism of FIG. 3A and its associated controller component.

SUMMARY OF THE INVENTION

In view of the above explanation, the present invention discloses an egg transfer system, and in particular one incorporating a series of volume capability enhanced and interconnected subassemblies, which provides faster and increased volume processing of items, such as eggs, conveyed through the various steps, including such as inspection/sorting, washing, grading and packaging, associated with an egg transfer operation. In specific regard, the present invention highlights a series of redesigns and improvements associated with the various processing operations of the egg transfer assembly, and which enables significant increase in egg transfer/handling capabilities than which has been heretofore possible.

A first subset module associated with a packaging operation incorporates a plurality of sensor/solenoid actuated release baskets, and in which according to one non-limiting variants the baskets remain on a three inch on center spacing as they are conveyed, such as by an advancing chain drive, along an underside of the overhead conveyor 8 as previously described. The underside arrangement of the solenoids/plungers as shown in FIG. 3B is similar to the prior art description previously had in reference to FIG. 3A, the difference being that the solenoids/plungers (again at 22 in FIG. 3B) are widened to a 4" on center spacing, along with the underside positioned and rotating brush rolls (reference being had to stacked subsections 18 in FIG. 1 et seq.) which are each likewise widened to four inches in width.

A modified controller associated with the present invention programs an offset into the solenoid/plunger release locations, this accommodating the variance in on center spacing of the plungers (e.g. again four inch on center) relative to the baskets (three inch on center). The offset is in effect an additional delay which compensates for the conveying speed of the baskets by varying the time in which a given solenoid is energized to trigger its plunger, thereby causing the basket to release its egg to the underside positioned and rotating brush stacks, and for which the individual rolls 18 each also exhibit a four inch spacing equal to that of the plungers.

The tray within which the grouping of individual release locations (again shown as up to eighteen locations in each of FIGS. 3A and 3B) can also be linearly displaced, such as within an eight inch range, over the conveying baskets. The ability to linearly reposition the grouping of release locations (again represented in FIG. 3B) to a desired spatial offset above the underside conveying and triggering baskets as well as the lower located and fixed rotating brush wheels, is intended to accommodate trajectory variations associated with the given travel speed of the baskets and so that, depending upon the speed of an egg supporting basket, the solenoid/plunger associated with that basket is moved to a location in which the triggered release and trajectory of the egg is programmed to cause it to align with a given receipt location of the rotating brush pair.

Additional features associated with the redesigned brush wheels include each subset roll section exhibiting a first greater plurality of inner circumference and linear extending bristle tufts, with either or both ends of each roll section including a further circumferential array of bristle tufts of increased stiffness. The result of the brush redesign is to cause eggs contacting between the outer stiffened ends to retain their desired position.

A further distinct component of the egg transfer system includes a receiving and packing reservoir located underneath the rotating brushes, the reservoir including tapered/outwardly widened receiving lanes which, in combination with the bristle redesign of the brush rolls, dramatically reduces egg migration between the lines and prior to narrowing to a final delivery location interfacing with an egg packing head, with subsequent depositing within a positioned egg packaging article.

A still further component of the present application also discloses an extended length conveyor roller (spool bar) design incorporated into each of a series of communicating subassemblies within the transfer system, including such as an inlet egg orienter, washer, dryer and candler. The widened egg support lanes can include any even or odd plurality of lanes, such as in one variant incorporating a total of eighteen roll define lanes defined nine apiece within two end to end connected subset spool bar portions having first and second, opposite end, chain drives, this in order to achieve a single widened and extending conveyor roller. A third (intermediate) chain drive attachment is provided at an intermediate location of each elongate extending and parallel arranged roller, this in order to prevent undesirable flex of the spool bars and resultant egg damage.

The intermediate chain drive, in combination with the configuration of the intermediate end-most extending spool bar portions, maintains a desired equal spacing between each of the egg roll lanes established within the various components of the egg transfer system. The configuration of the subset spool bars further maintains even spacing between the widthwise defined lanes, regardless of whether an even or odd number of total lanes are incorporated into the design architecture of the spool bars, thus allowing for the use of standard components in other critical elements of such as an egg grading system, such as along an egg transfer location within which the redesigned/widened spool bars are positioned.

Each of the extended conveyor rollers further can optionally incorporate, such as at each of outer and intermediate inner opposing end locations, insert mounted/integrated support bearings. Such bearings can, without limitation, be provided in the form of a wear resistant plastic (e.g. nylon), and which promote structural rigidity (anti-flex or bend of the individual spool bar portions at the intermediate chain drive location), as well as retarding wear of both the bearings and the spool bars. It is also envisioned and understood that other types of end support bearings can be employed, these including varying sized (i.e. diameter) cylindrical shaped inserts for seating within the open annular interior of the spool bar portion, as well end surface extending flanges which abut the annular end faces of the spool portions and which seat (such as via apertures defined therethrough) supported upon locations of the spool bar rotating chain drives (such as further including three chain drives associated with both ends and intermediate location of the egg conveyor interior.

BRIEF DESCRIPTION OF THE DRAWINGS

Reference will now be made to the attached drawings, when read in combination with the following detailed description, wherein like reference numerals refer to like parts throughout the several views, and in which:

FIG. 3A is an illustration of a prior art egg conveying and solenoid spacing arrangement;

FIG. 3B is a similar illustration of the solenoid spacing arrangement associated with the present invention and similar to that illustrated in FIG. 3;

FIG. 3C is a prior art sectional illustration of a carriage extension associated with the new design;

FIG. 12 is a perspective view of a modified spool bar portion exhibiting a coiled spring spool configuration, this in substitution of a rubberized spool bar construction;

FIG. 13A is an enlarged partial view of an integrated support and (anti-wear) bearing which is secured at each opposite end location of a spool bar portion according to the present invention.

DETAILED DESCRIPTION OF THE PREFERRED EMBODIMENTS

As previously described, the present invention discloses a series of interconnected subassemblies for providing faster and increased volume processing of items, such as eggs, conveyed through the various steps, including such as inspection/sorting, washing, grading and packaging, associated with an egg transfer operation. More specifically, and as initially described with reference to FIGS. 1-6, the present invention highlights a series of redesigns and improvements to the controller functions associated with the design variations in the widened on center spacing of the solenoid/plungers and rotating brush roll portions versus the smaller on center spacing of the individual egg carrying baskets. Successive reference to FIGS. 7-13 describes the additional novel aspects of the widened spool bar design, such as applicable to any of the egg orienter, washer, dryer and candler operations.

As is also described in detail, the outwardly flared lanes associated with the underneath positioned reservoir receive eggs deposited by a pair of parallel spaced and opposingly rotating wheels, with dramatically reduced egg migration between the lines, and prior to final delivery to a conventionally sized egg packing head and subsequent depositing within a positioned egg packaging article. One non-limiting objective of the present design is the ability to retrofit an existing egg conveyor/transport operation to operate at either or both of an increased speed and/or volume delivery basis, such as by the incorporation of the features disclosed herein.

Figure 1:
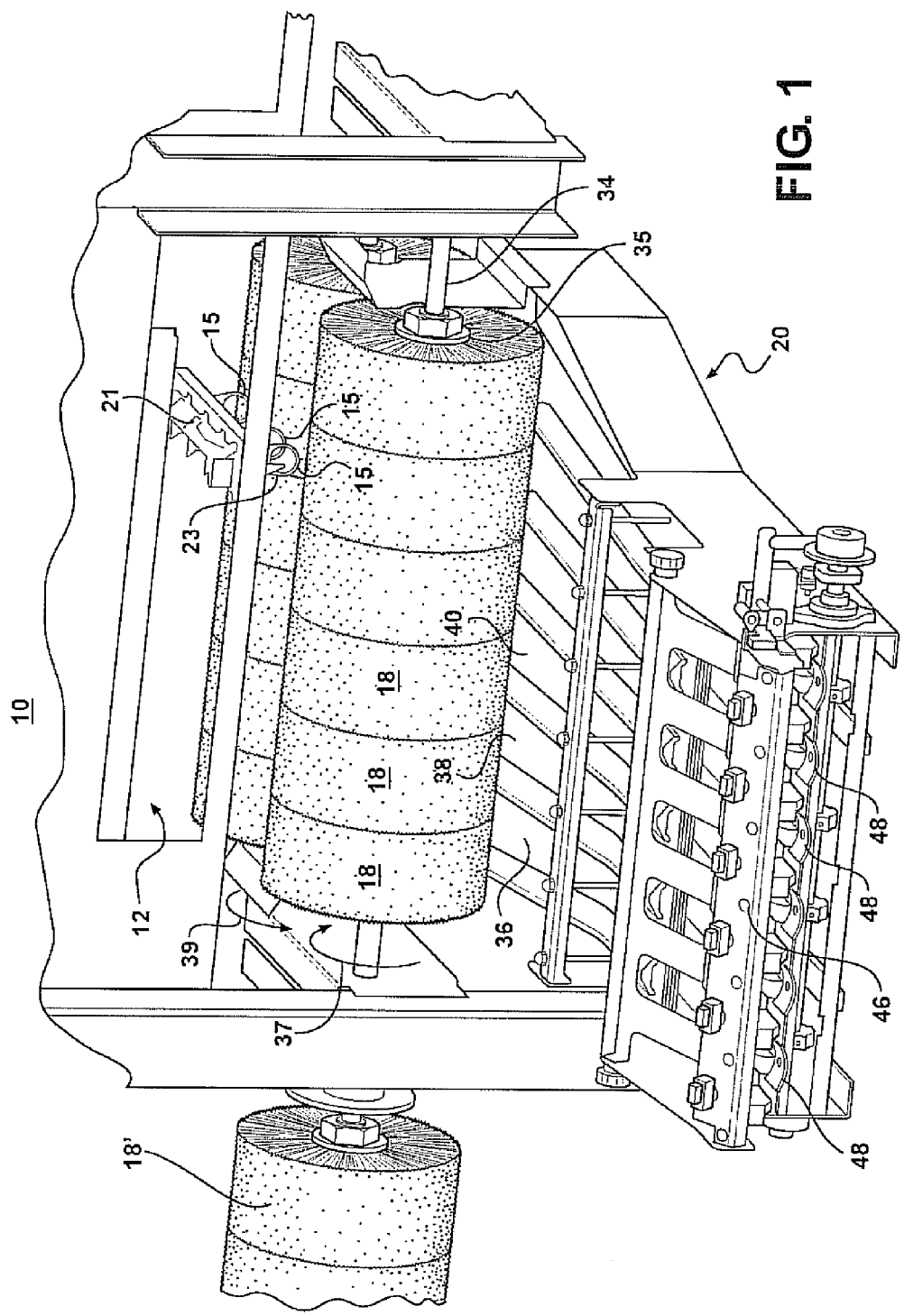
FIG. 1 is a first environmental perspective, illustrating the features of the overhead egg conveyor (with modified software controlled solenoid actuated release plungers associated with individual egg transfer/release baskets), increased diameter and redesigned brush wheels (exhibiting outer stiffened bristle tufts) and redesigned egg receiving conveyor (reservoir) for interfacing a standard sized egg packing head with the enlarged/redesigned brush wheels, via redesigned flared side plates and variably bent channel guides.
Figure 14:
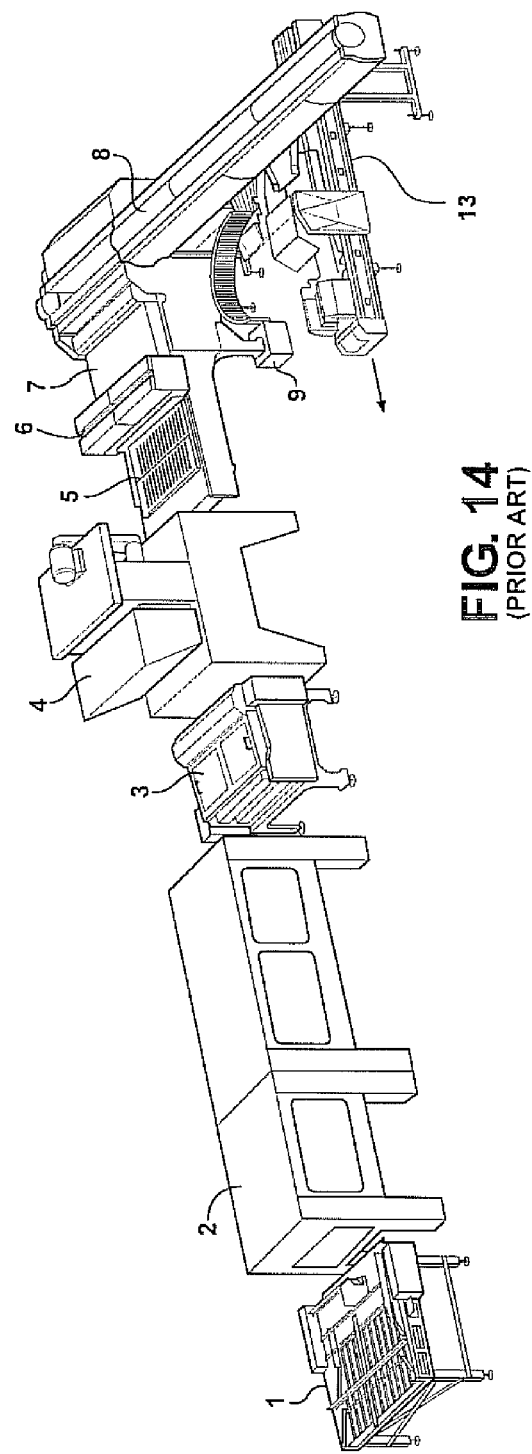
FIG. 14 is a perspective assembly view of the overall egg transfer system incorporating the features of FIGS. 1-13.

Referring initially to FIG. 1, a view is shown in perspective cutaway of a basket conveyor (corresponding to what was previously represented at 8 in FIG. 14). As described previously, the conveyor incorporates a plurality of individual egg supporting and clamshell release baskets 15, these being arranged in three parallel and continuously extending rolls in the illustrated embodiment and being engaged by a chain drive (not shown) and so that the egg release baskets continuously convey a spaced distance in a region 12 located underneath the downwardly facing solenoid/plunger array 22 (see also FIG. 2) and in an unequalled spaced fashion as specifically illustrated in FIG. 3B.

Figure 2:
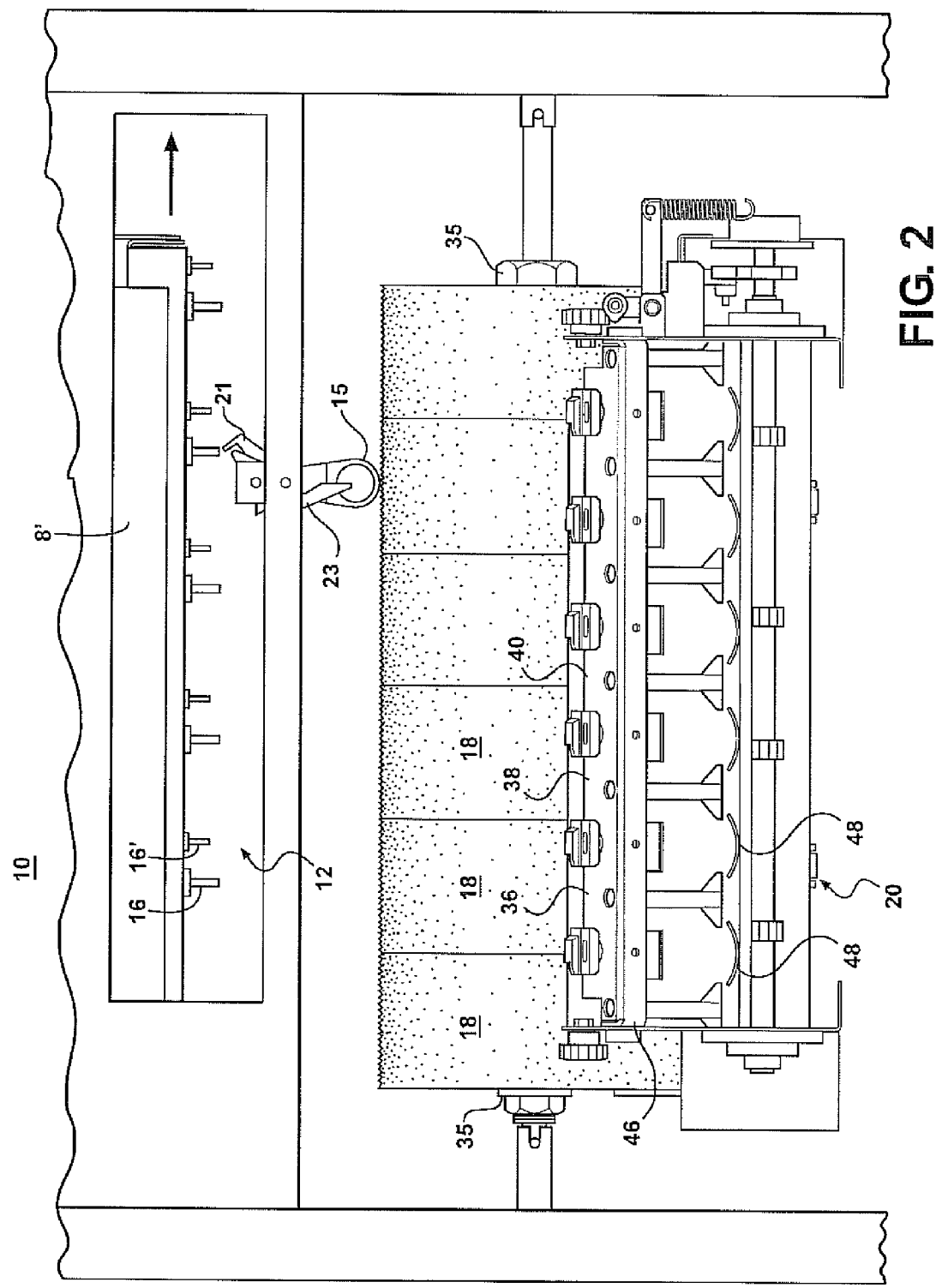
FIG. 2 is frontal plan illustration of FIG. 1 and illustrating from another vantage the interface between the egg transfer/release baskets, rotating egg contact/redirecting brush wheels, and receiving reservoir.
Figure 2A:
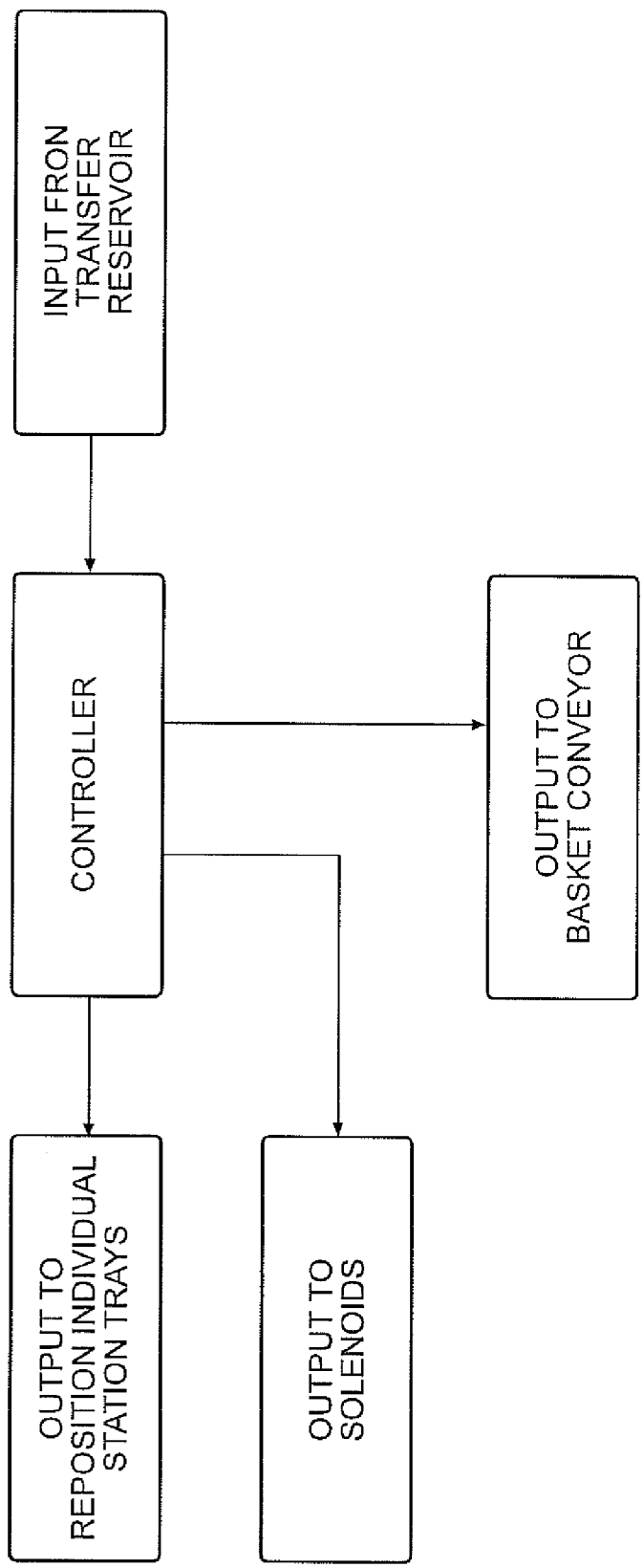
FIG. 2A is a schematic view of a controller and associated output components interfacing with the various redesigned components of the present invention.
Figure 3:
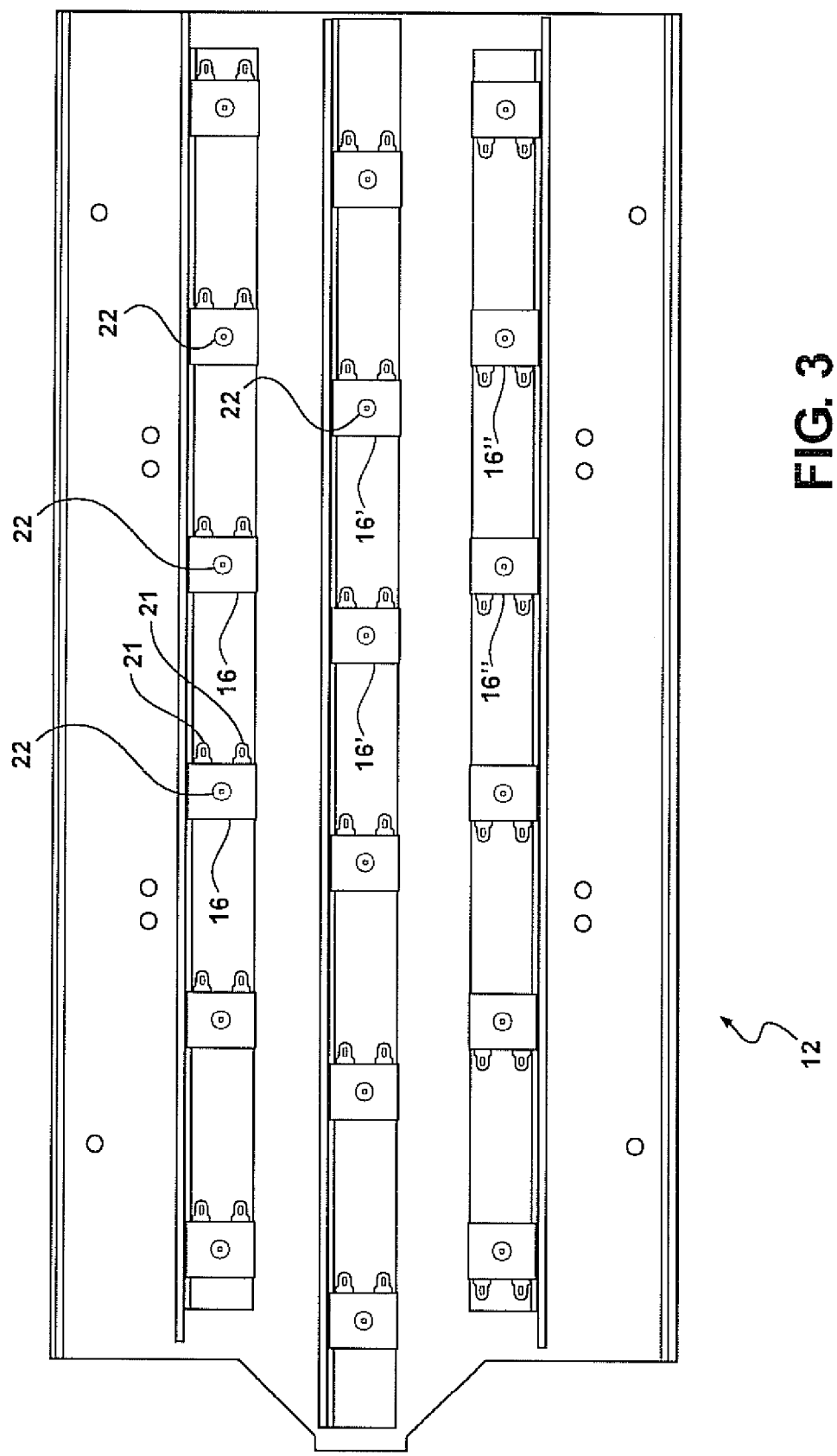
FIG. 3 is a plan view of the egg conveyor (with individual pairs of release baskets removed for clarity of illustration), shown from an underneath looking direction and in which the conveyor traverses overhead and in generally parallel fashion relative to the rotating brush wheels and illustrating the offset solenoid spacing along the egg transfer carriage, and which is designed to compensate for redesign (enlargement) of the rotating egg receiving brush wheels.

As also shown in FIG. 2, a selected tray 8' is shown and within which the grouping of individual release locations (again shown as up to eighteen locations in each of FIGS. 3A and 3B) can also be linearly displaced, such as within an eight inch range, over the conveying baskets 15. As previously indicated, the ability to linearly reposition the grouping of release locations (again represented in FIG. 3B) to a desired spatial offset shown as 1¼" at 17 above the underside conveying and triggering baskets as well as the lower located and fixed rotating brush wheels, this accomplished by the controller functions identified in schematic in FIG. 2A, is intended to accommodate trajectory variations associated with the given travel speed of the baskets and so that, depending upon the speed of an egg supporting basket pair 15, the solenoid/plunger 22 associated with that basket is moved to a location in which the triggered release and trajectory of the egg is programmed to cause it to align with a given receipt location of the rotating brush pair, see individual roll stacks 18.

As will be described, the individual pairs of end to end arranged and opposingly rotating brush rolls correspond with each of a plurality of parallel packaging operations (see adjacent roll pair partially shown by roll 18' in FIG. 1 and which identifies an adjacent downstream packaging operation). Multiple packaging lines are employed to account for eggs of varying weight (and corresponding size).

FIG. 2A again schematically illustrates a controller component associated with the present inventions and in which an input signal from the transfer reservoir (such as including an input parameter for receiving such as a weight of a previously measured egg) is processed. In response to the input from station 7, the modified controller issues a series of one or more output signals to each of the basket conveyor, solenoid tray 8' and individual solenoid/plungers 22, thus varying the operating characteristics of each to account for the increased throughput of the egg transfer system and to again accommodate the design variation in the on center spacing of the solenoid/plungers and rotating brush wheels (such as enlarged to 4" on center in the illustrated and non limiting variant), this again relative to the smaller on center spacing of the release baskets 15 (such as again are retained at 3" on center).

The controller, upon identifying a correct release location as previously described, energizes the solenoid associated with the given plunger 22 to extend (up to ½" as described in the prior art example of FIG. 3C), at which point the forward motion of the offset basket it acts upon causes a release portions (see at 21) associated with the underside conveyed baskets 15 to be triggered by the solenoid extended plunger and to thereby release the egg resulting from the weight of the captured egg outwardly displacing the now unrestrained and associated pair of clamshell baskets 15. Reverse extending portion shown at 23 is further associated with a contact location of the transfer reservoir 7, this causing the baskets 15 closed about a pre-positioned egg at that station and prior to conveying to the various solenoid stations located along the conveyor underside 8.

A redesigned egg packer with tapered conveyor (reservoir) is again referenced at 20 (see also FIG. 6), upon which eggs are deposited from the (opposingly) rotating brush wheels 18, within designated lanes, and which interface with a standard sized egg packing head. The present description will entail a more detailed explanation of the various sub-components of the redesigned egg transfer subassembly 8, as set forth throughout FIGS. 3-6, and with repeated reference to the overall assembly views of FIGS. 1 and 2.

As described previously, the modified controller associated with the present invention programs an offset into the solenoid/plunger release locations, this accommodating the variance in on center spacing of the plungers (e.g. again four inch on center) relative to the on center spacing of the continuously conveying baskets (three inch on center). The 1¼" center row offset 17 is in effect an additional delay which compensates for the conveying speed of the baskets by varying the time in which a given solenoid is energized to trigger its plunger, thereby causing the basket to release its egg to the underside positioned and rotating brush stacks 18 and for which the individual roll portions 18 each also exhibit a four inch spacing equal to that of the plungers.

Figure 4:
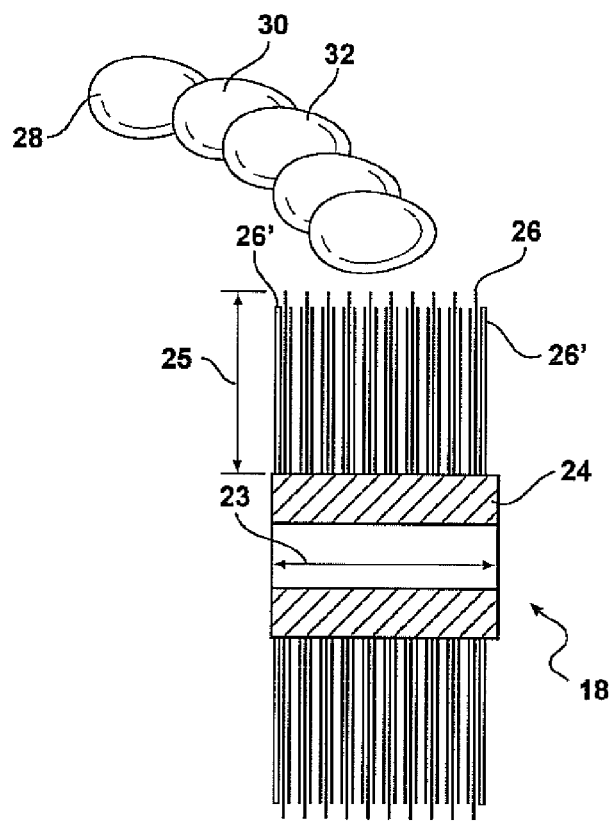
FIG. 4 is a plan diagrammatic view of a selected brush wheel incorporated into the current design, and which includes features such as increased width, number of bristle tufts, and outer width extending stiffening bristles for providing increased egg protection and targeted redirection.

Referring to FIG. 4, a plan diagrammatic view is shown of a selected brush wheel 18 incorporated into the current design, and which includes features such as increased width (see arrow 23), number of bristle tufts, and (optional) outer width/thickness extending (arrow 25) stiffening bristles for providing increased egg protection and targeted redirection. According to one non-limiting variant, each brush wheel exhibits a central hub, shown in cutaway at 24, and which (in one non-limiting variant) is increased in width dimension from 3" to 4". The brush wheels 18 are provided in multiple stacked fashion (such as up to six per subset portions per overall roll, with each subset section exhibiting the arrangement shown in cutaway in FIG. 4.

As shown in FIG. 4, a number of individual bristle tufts 26 extend in outwardly projecting fashion from the central hub 24, around both a circumference and linear distance of the hub, each tuft increased (such as from 6 to 9 per row of tufts) when counting laterally across the width of the hub. Additional and outermost positioned tufts, see as shown at 26', are provided and which each exhibit both stiffer and larger diameter filaments, and such as which is composed of a synthetic material. The incorporation of the additional tufts, so as to include both the inner and substantial width extending softer tufts 26 and the outer enlarged/stiffer tufts 26', provide a greater landing area for each of the eggs, see as shown by trajectory pattern 28, 30, 32, et. seq, and as they are received by the rotating brush rolls 18 and upon being discharged from the solenoid/plunger and basket locations defined upon the overhead conveyor 12).

Figure 7:
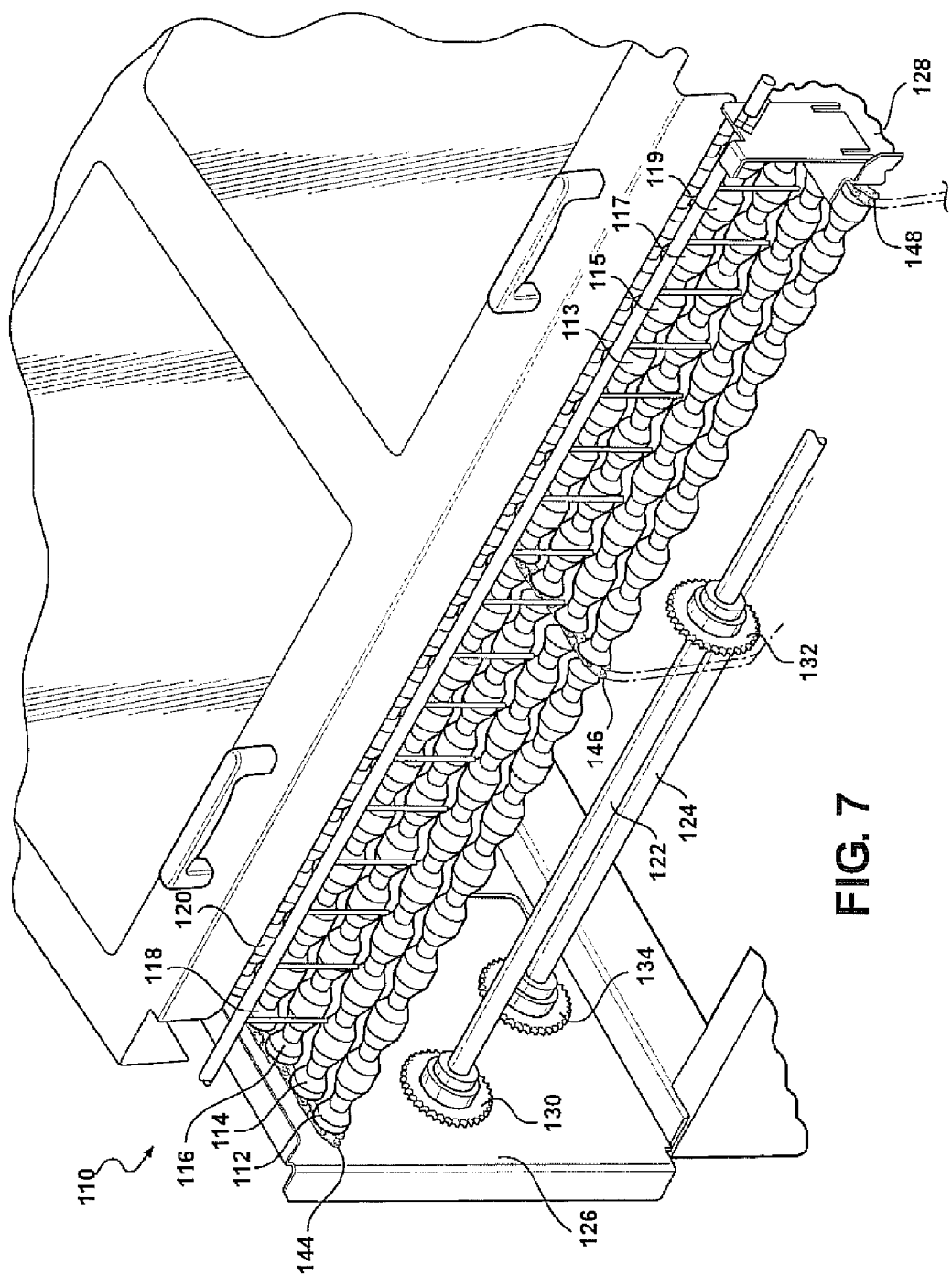
FIG. 7 is an environmental view of an egg transfer location of an egg conveying/grading system, and which illustrates a plurality of egg transfer spool bars arranged in end-to-end paired fashion an intermediate third chain drive and support.

In this fashion, greater operating speeds of the overall egg transfer assembly are possible and which further allows the rotary brush rolls 18 to receive and redirect the released eggs 28 with greater predictability to the individual lanes associated with the egg receiving reservoir (see again at 36, 38, 40, et seq. associated with packer 20 in each of FIGS. 1, 2 and 7). The outermost positioned and stiffer bristle tufts 26' associated with each subset brush roll (again FIGS. 1, 4 and 5) additionally offer improved performance of the overall egg handling system, such as in preventing the eggs from coming into contact with the rotating hub 24 of each subset brush roll as well as the stiffer bristle tufts 16' encouraging the impacting eggs 28, to redirect, or funnel, towards the center of each brush wheel 18, thereby improving overall performance by avoiding the instances of egg mitigation to adjacent lanes 36, 38, 40, et seq., of the packer reservoir 20, or breakage of the eggs resulting from them impacting the side walls separating the lanes.

In this fashion, redesign of the rotary brush head reduces the incidences of egg redirection to adjoining lanes reservoir lanes (such as due to the egg bouncing off an edge location of the rotating brush and being propelled to land upon a lane other than that which is aligned with the brush wheel. The result of such undesirable egg redirection includes 1) the accumulation of eggs upon selected reservoir lanes, this requiring constant operator attention/intervention, and 2) an increased incidence of egg breakage resulting from contact with the reservoir lane dividers.

Figure 5:
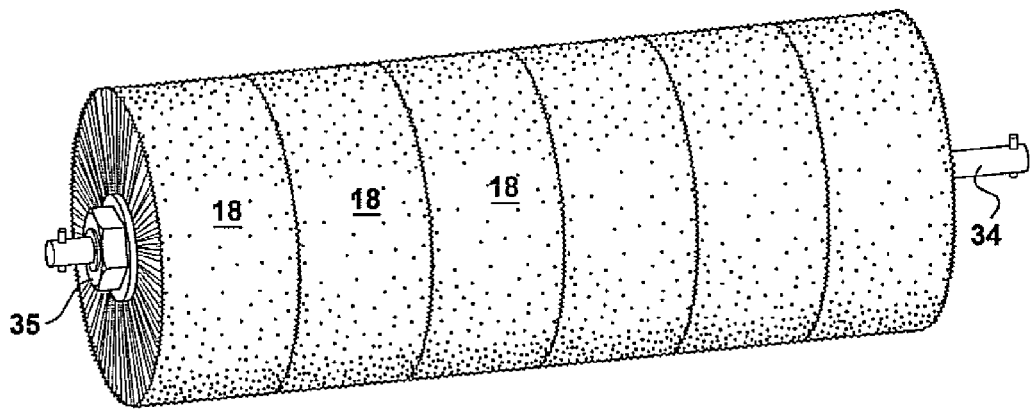
FIG. 5 is a sectional perspective of a selected row of individual stacked brush wheels.

Referring now to the sectional perspective of FIG. 5, in combination with the environmental views of FIGS. 1 and 2, each of the individual brush wheels 18 are stacked in multiple rows (such as respective rows of six individual or subset brush sections) mounted upon a common shaft 34. The stacked brush wheels 18 are maintained in their desired arrangement by a pair of end disposed nuts, see also shown for example at 35, these securing to spaced apart locations of the shaft 34 and enabling the stacked plurality of brush wheels 18 to rotate by virtue of an input drive, such as associated with an electrical motor (not shown) which may be mounted within the system architecture of FIGS. 1 and 2.

In operation, and as best shown in FIG. 1, the rotating brush wheels are provided in parallel/horizontally extending, narrowly spaced and opposingly rotating (see arrows 37 and 39) pairs. The spacing defined between the rows of opposingly rotating brushes 18 are such as to promote receipt of the eggs delivered from the solenoid/plunger locations of the overhead traveling conveyor, and subsequent transfer of the eggs between the brush wheels, in aligning fashion with each pair of opposing rotary brushes 18, and for subsequent delivery to the assigned lanes 36, 38, 40, et. seq. of the egg packing reservoir 20.

As previously explained, the incorporation of increased width brush segments (as again reflected by increased width of each brush wheel hub 34) allow for operation at faster speeds and for higher resulting throughput of eggs. Additionally, the incorporation of varying stiffness bristles improves accuracy of reception (and subsequent throughput distribution) of eggs to the correct pairs of opposingly rotating brush wheels).

It is also envisioned that, additional or alternative to increasing the width of one or more of the individual brush wheel hubs 34, an associated outer diameter of selected brush wheels (as defined by the extending ends of the bristles), can be modified and relative to the contact locations of the eggs as dropped into the path of the opposingly rotating brush wheels (again FIG. 1). Such is contemplated to include moving the opposingly rotating and parallel extending brush wheel stacks either closer or further away from each other, increasing a thickness dimension of one or more of the hubs 24 (shown in cutaway in FIG. 4) and/or increasing/decreasing the extending length of each group (tuft) of softer inner bristles 26 and harder outer bristles 26".

Figure 6:
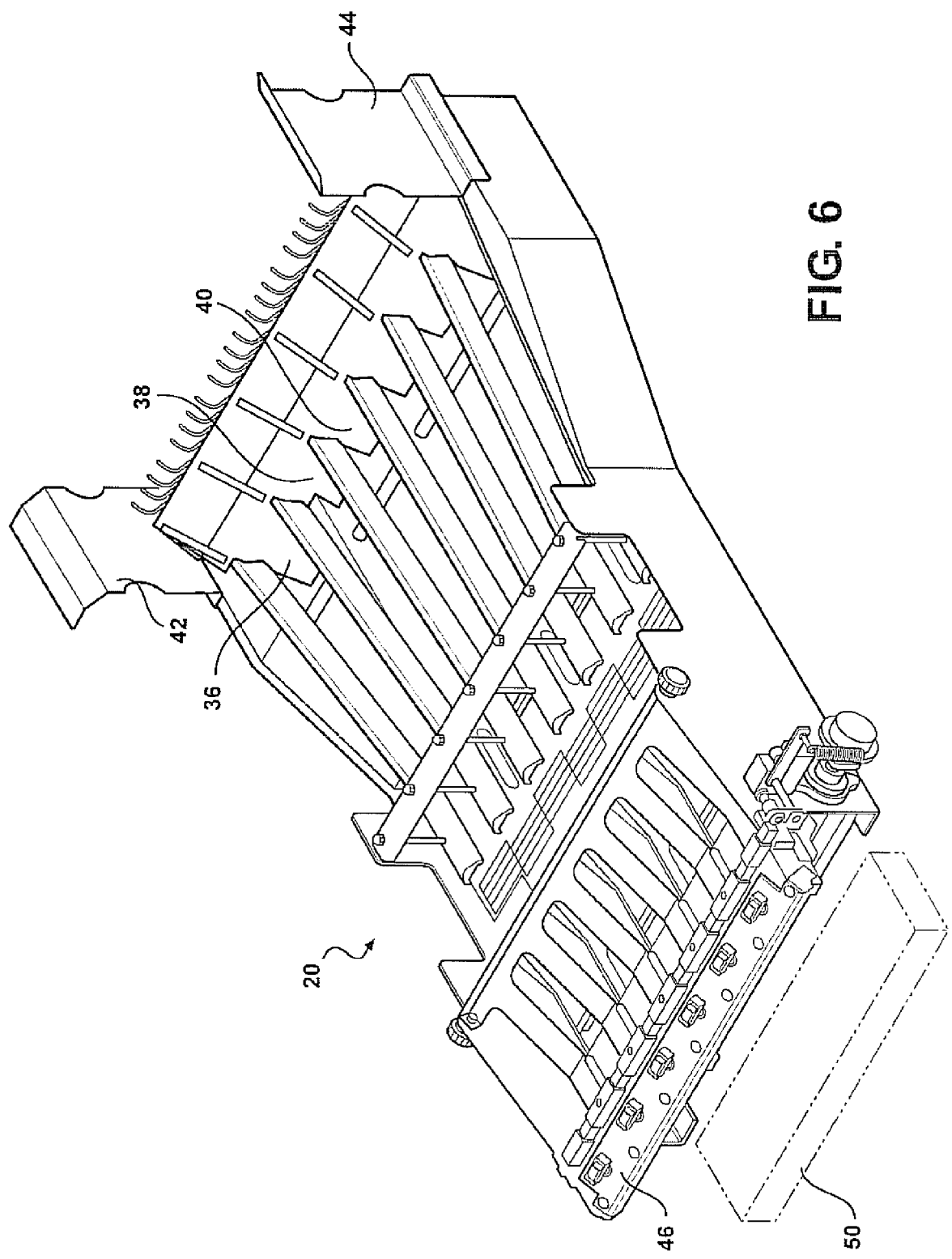
FIG. 6 is a sectional perspective of the egg collection reservoir for again interfacing a standard sized egg packing head with the enlarged/redesigned brush wheels, via redesigned flared side plates and variably bent channel guides.

Referring to FIG. 6, a sectional perspective is again shown of the egg collection reservoir 20, and which best illustrates the series of parallel extending lanes 36, 38, 40, et. seq., which generally align with the rotating brush wheels 18 (see again the arrangement of the opposingly rotating stacks of brush wheels relative to the individual lanes associated with the egg reservoir in FIGS. 1 and 2). Notable redesigns to the reservoir 20, in order to adapt to the wider brush redesign, include the flaring of side plates 42, and 44, as well as the individual and variable bending of the individual channel guides/lanes 36, 38, 40.

In this fashion, and as previously described, the redesigned reservoir 20 is capable of receiving the delivered eggs in more predictable fashion within each of its individual defined lanes (such as with dramatically decreased incidences of egg migration to adjoining lanes). The eggs are then conveyed along their respective lanes to the packaging head interface, illustrated at 46, and prior to final transfer, via delivery locations 48 (see FIGS. 1 and 2) to a conventional egg packaging container (see at 50 in phantom in FIG. 7). Otherwise, the conveyor/reservoir 20 utilizes standard components for belting, drive and mechanical interface to the packaging head interface 46.

Referring now to FIGS. 7-13A, a description will now be made of the extended length conveyor roller (spool bar) design and which, as previously described, are incorporated into various components of the egg transfer system, including but not limited to such as the egg inlet/orienter 1, washer 2, dryer 4 and candler 5 referenced in FIG. 14. In particular, the present invention also discloses a widened egg transfer (spool bar), this increasing in number the egg supporting lanes, such as from twelve to eighteen rolls, at various locations throughout the overall egg transfer system. As will be described, and in combination with incorporating an intermediate positioned support bar and third (intermediate) chain drive attachment (such at a midpoint location of each of a pair of end-to-end supported and elongate extending spool bar portions), the widened and plural/parallel spaced and widthwise extending spool bars allow for the transfer/conveyance of an increased volume of eggs by the existing machines, and without the incidence of undesirable flex of the spool bars and resultant egg damage.

Referring first to FIG. 7, an environmental view is generally shown at 110 of an egg transfer location of an egg conveying/grading system, this illustrating a plurality of egg transfer spool bars 112, 114, 116, 118, 120, et. seq. which are arranged at an inlet end location of the egg conveyor. The spool bars are capable of being constructed of a number of potentially different materials, such as including being constructed of a rubber spool tube, the construction of which permits the individual rotation of the spool bars to cause individual eggs to advance progressively along each of the lanes collectively established by succeeding parallel spaced spool bars (see exemplary lanes 113, 115, 117, 119, et. seq. in FIG. 7). It is also envisioned and understood that the spool bar construction is not limited to rubber, but can also be formed or surfaced with other materials not limited to hard plastics (such as nylon) and even steel or other types of metal.

As is further clearly shown, the spool bars 112, 114, 116, 118, 120 each further include alternating enlarged and narrowed diameter portions along their respective cross wise extending lengths, these establishing each of the individual egg conveying lanes which, upon aligning the width extending and parallel spaced spool bars in the manner shown, cause the aligning narrowed diameter portions to create individual egg conveying lanes, see directional lines 113, 115, 117, 119 et. seq., as shown in FIG. 7. As stated above, the even spacing between the lanes is maintained, regardless of whether an even or odd number of total lanes are incorporated into the design architecture of the spool bars, thus allowing for the use of standard components in other critical elements of such as an egg grading system, such as along an egg transfer location within which the redesigned/widened spool bars are positioned.

The present invention further contemplates the widened spool bars being incorporated into a custom designed egg conveying (or transfer) operation. That said, it as also understood that the inventive concepts set forth herein are also potentially applied in the retro-fitting of existing egg transfer equipment, such as to include the widened and redesigned spool bars. In either application, a feature of the invention is the ability to establish any plurality (such as ideally a greater plurality) of individual and egg conveying defined lanes (again at 113, 115, 117, 119 et seq.), with the below described spool bar portions and intermediate chain drive supports being configured such that even spacing between each egg roll conveying lane is maintained, this in turn permitting use of existing controls.

Additional structural features of egg conveyor include, as most prominently illustrated, spaced apart and crosswise extending chain support and drive shafts 122 and 124, these being mounted in rotating fashion to ends 126 and 128 of the conveyor and so that the shafts extend across an open space at which the egg conveyor inlet is defined. The shafts 122 and 124 each further exhibit exteriorly teethed gears which are mounted to and rotary driven by the shafts, at both opposite end and intermediate locations. In each of FIGS. 7 and 8, the shaft 122 illustrates both end position and intermediate positioned teethed gears, respectively at 130 and 132 (corresponding with end 126 and intermediate locations of the conveyor). Parallel extending and spaced shaft 124 further illustrates teethed gears 134 and 136 (see as further best shown in FIG. 8) in aligning and mating position with gears 130 and 132 of the first (and upper) shaft 122.

Hidden from view are additional and third opposite end mounted teethed gears (these corresponding to an inner facing surface of conveyor end 128 and in like mounting fashion in comparison to the first inner end face mounted gears 130 and 134). As also shown in FIG. 8, a third shaft is largely hidden from view, see at 138, and includes a further sect of aligning teethed gears, at 140 and 142, which cooperation with the spaced apart second shaft gears 134 and 136, cooperatively align with and drive the primary gears 130 and 132 of shaft 122 and which, according to one non-limiting application, operate for driving the various chain gears aligned with the three spaced apart gears (e.g. as again shown at 130 and 132 and hidden from view in respect to conveyor end face 128).

A plurality of three chain drives and supports are shown at 144, 146 and 148 (see as best shown in FIG. 7), these operatively driving by rotation of the drive shaft 122 and supporting shafts 124 and 138. The interconnecting linkage between the drive shaft and chain drives and supports is not illustrated but is understood to result in the actuation of the chain drives and supports, and which in turn individually rotate each of the spool bars 112-118. It is also envisioned and understood that not every one of the gears 130, 132, 134 are driven and, depending upon the design and operational protocols of the specific egg transfer machine being employed (this being outside of the invention as defined herein) specified gears can either be powered, slaved or even free-wheeling.

Figure 8:
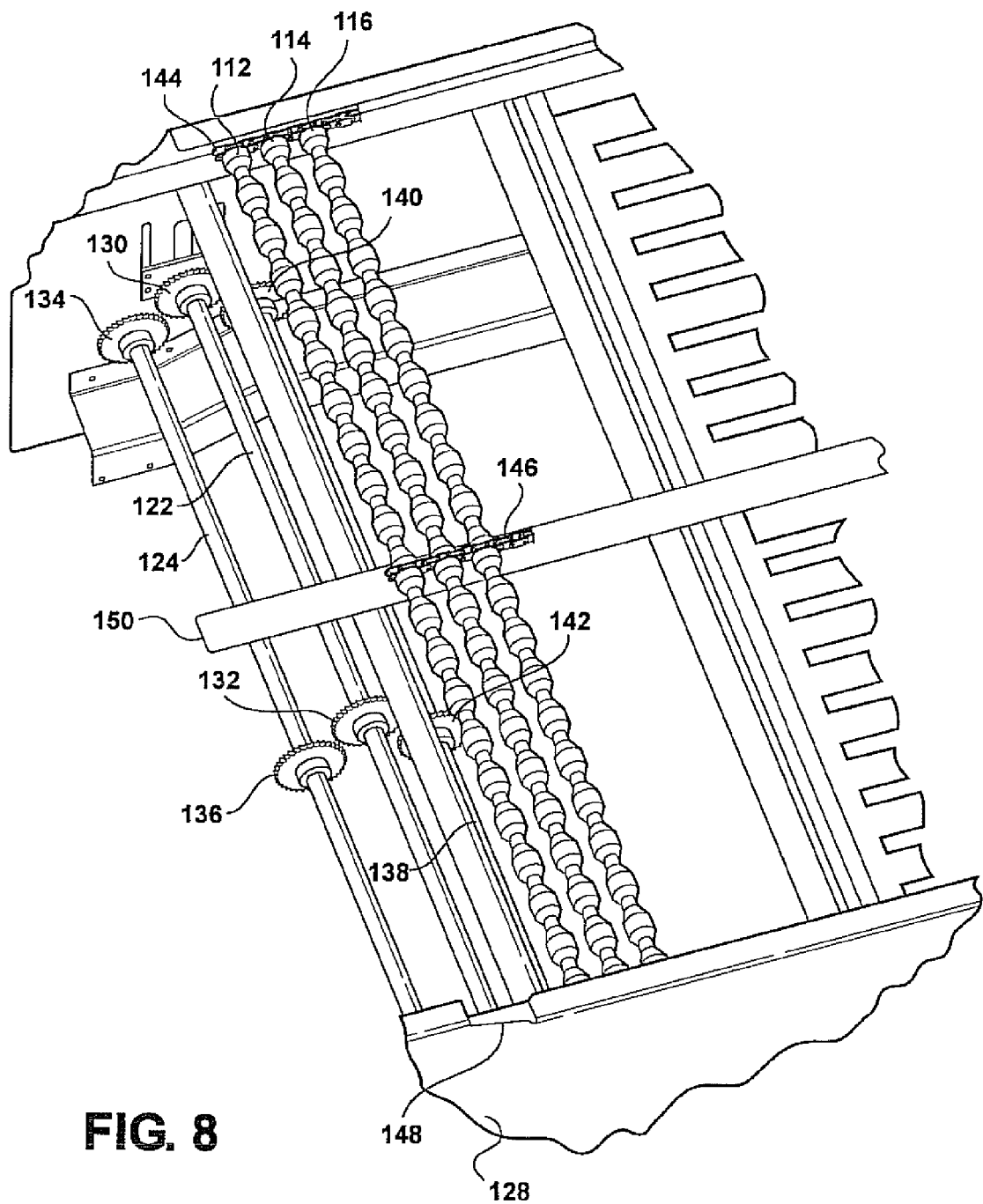
FIG. 8 is a rotated perspective of the egg transfer assembly shown in FIG. 7, and illustrating the arrangement of additional components such as an intermediate extending bracket for supporting thereupon the third intermediate chain drive and support.

As best shown in each of FIGS. 7 and 8, the plurality of elongated spool bars 112-118 are supported at both the end mounted and intermediate supporting locations by the arrangement of the chain drives 144, 146 and 148. As illustrated in FIG. 8 (but not the corresponding view of FIG. 7 and which in comparison illustrates different features), an intermediate extending support brace is shown at 150. The positioning of the brace 150 is such that it established an underside supporting location to the intermediately positioned chain drive 146 (again FIG. 8) and by which undesirable bow or sagging of the spool bars (identified by individual and end-to-end connected pairs of spool bar portions defining each of the overall spool bars 112-118) are prevented from bowing or sagging.

Figure 9:
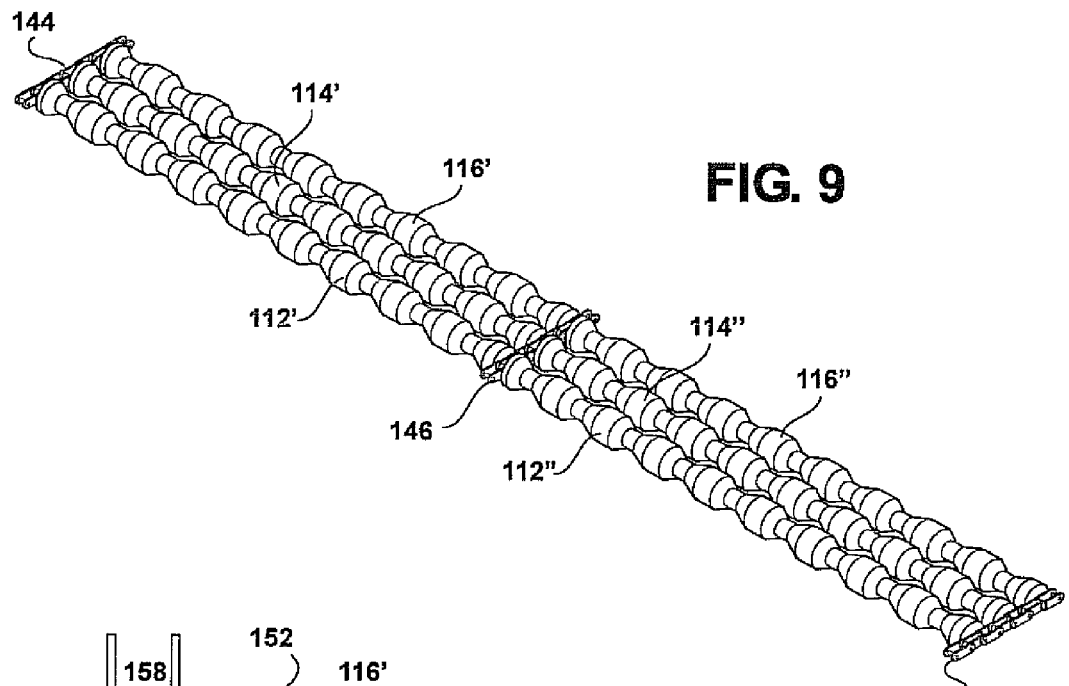
FIG. 9 is a sectional perspective of an arrangement of spool bars in paired end-to-end secured fashion, and exhibiting both first and second end mounted chain drives as well as an intermediate and third chain drive and support for rotating the spool bars in a cooperating and egg advancing fashion.
Figure 10A:
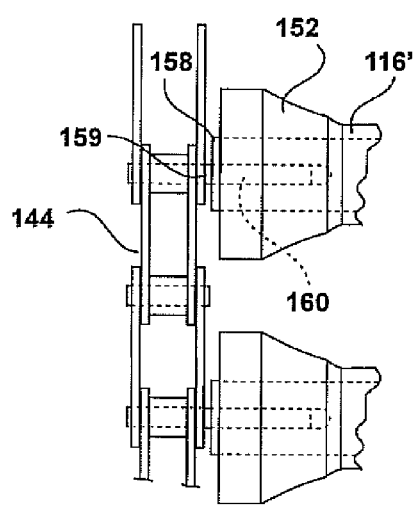
FIG. 10A is a first enlarged partial view taken from FIG. 10 and showing a selected end mounting location established between a selected spool bar portion and the egg transfer mechanism.
Figure 10B:
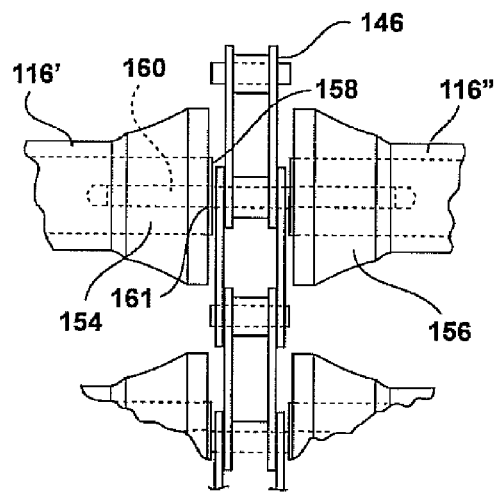
FIG. 10B is a second enlarged partial view taken from FIG. 10 and shown an intermediate mounting location established by the third chain drive and support and opposing intermediate mounting ends of each end-to-end connected pair of spool bar portions, these further illustrating the evenly spaced nature of the individual egg roll lanes.
Figure 10:
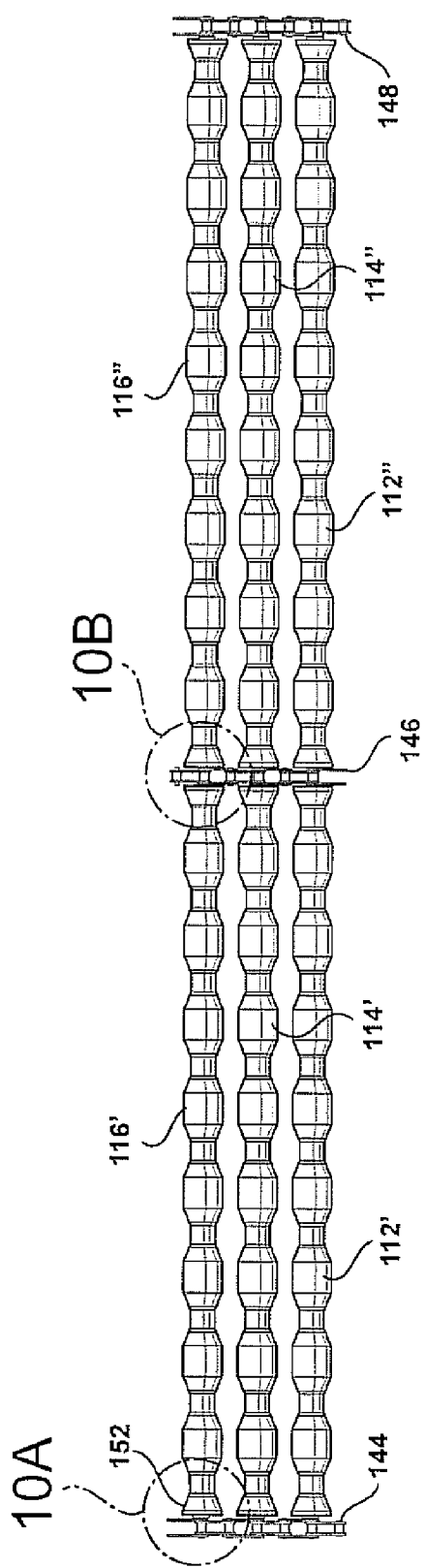
FIG. 10 is an enlarged and overhead plan view of the spool bar arrangement shown in FIG. 3 and further illustrating the features of the positioning and spacing of the spool bar portions in two dimensional fashion.

The intermediate (conveyor midpoint) chain drive and support 146 is incorporated between each subset pair of spool bar portions, see as further referenced in FIGS. 9 and 10 and which are broken down into individual spool bar portions 112' and 112" (collectively comprising spool bar 112), portions 114' and 114" (collectively comprising spool bar 114), and portions 116' and 116" (collectively comprising spool bar 116). In order to maintain a desired equal spacing between each of the (eighteen) lanes defined by the elongated spool bars, the configurations of each outer and intermediate connecting end portion is such that it maintains a desired equal spacing between each of the egg roll lanes. As will be further understood, the intermediately positioned chain drive 146 is not necessarily located at an equidistant midpoint location between the inner facing end surfaces 126 and 128, rather it is envisioned that the intermediate chain drive can also be positioned closer to one end or the other, dependent upon factors such as the relative sizing of the end-to-end connected spool bar portions (and which can further contemplate different lengths corresponding to differing pluralities of even or odd numbers of lanes).

In one envisioned application, the support and chain attachment components are mounted in otherwise unused space, thus not adding to the space requirements of the egg transfer spool bars. The intermediate support configuration provided by the intermediate chain drive 146 and the opposing connecting ends of each spool bar portion further may be integrated into a single component.

FIG. 10A is a first enlarged partial view taken from FIG. 10 and showing a selected end mounting location 152 established between selected spool bar (subset) portion 116' and the associated chain linkage 144 of the egg transfer subassembly 7. The end of the spool bar portion 116' is represented by outwardly flared portion 152 which is configured such that, upon mounting within the egg transfer mechanism, an equal spacing is maintained between each of the multiple egg roll lanes (previously at 113, 115, 117, 119, et. seq.) established between the end-to-end connected spool bar portions and overall parallel spaced arrangement of the multiple spool bars 112-118.

Reference is also made to FIG. 10B, and which shows is a second enlarged partial view taken from FIG. 10 of an intermediate mounting location established by the intermediate chain drive and support 146 and opposing intermediate mounting ends 154 and 156 of each intermediate end-to-end connected pair 116' and 116" of spool bar portions, these again illustrating the evenly spaced nature of the individual egg roll lanes, such that a first and most proximate egg roll defined lane associated with spool bar portion 116' exhibits an equal spacing relative to both a succeeding outward lane of that spool bar portion 116' as compared to a first and most proximate egg roll defined lane associated with the spool bar portion 116" connected to the opposite side of the intermediate chain drive and support 146.

Figure 11:
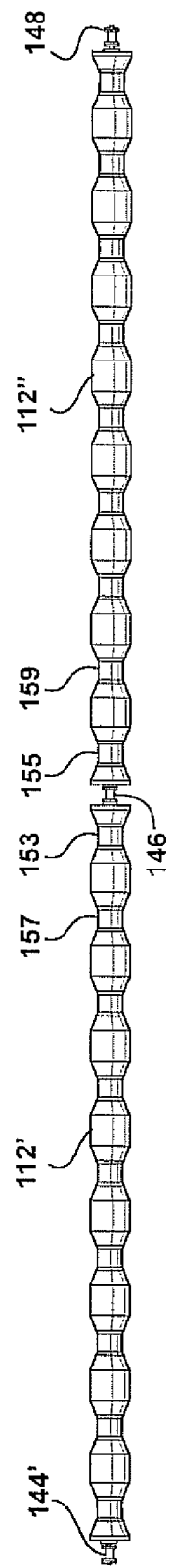
FIG. 11 is a front view of the arrangement shown in FIG. 10 and illustrating a forward most located of the pairs of end-to-end mounted spool bar portions, as well as illustrating the configuration of end supporting brackets.

FIG. 11 is a front view of the arrangement shown in FIG. 10 and illustrating a forward most located of the pairs of end-to-end mounted spool bar portions, as well as illustrating the configuration of end supporting brackets. The illustration of FIG. 11 also references innermost roll lanes 153 and 155 respectively associated with the spool bars 112' and 112", on opposite sides of the intermediate chain drive 146, and which are equally spaced both relative to each other and to outer succeeding roll lanes 157 (for spool bar 112') and 159 (for spool bar 112").

The configuration described above allows for the use of standard components in other critical elements of such as an egg grading system, such as along an egg transfer location within which the redesigned/widened spool bars are positioned. Although not further identified, each of the other spool bar portions exhibits a similar end configured profiles, these in order to maintain an equal lane spacing and dimension throughout the transfer assembly.

As again referenced, the individual spool bar portions each provide for nine individual egg conveying (or rolling) locations. Each of the extended conveyor rollers further incorporates both end and intermediate mounted/integrated support bearings, these being illustrated in the enlarged partial view of FIG. 13A and which shows an integrated support and (anti-wear) bearing having a disc shaped body 158 and an integrally formed and extending and spool bar end inserting shaft portion 160 (see also FIGS. 10A and 10B).

The bearings are optional features not required but optionally applicable to the spool bars, these typically constructed of a plastic (e.g. nylon) or other suitable material exhibiting the properties of durability, low friction and wear resistance, and which are secured at each opposite end mounting location of a spool bar portion to a connecting chain linkage and support 144, 146 and 148. As best again shown in the enlarged partial views of FIGS. 10A and 10B, each of the chain drive linkages include individual and rotating drive pins (see as exemplary illustrated at 159 associated with outer rotating end of spool bar 116' as well as at 161 associated with opposite outer rotating end of spool bar 116"). The drive pins are rotated by the associated chain linkages and which, upon seating within inner end apertured locations defined in an end face of the disk shaped body 158, in turn rotate the various spool bars to advance the eggs therealong the defined lanes 113, 115, 117, 119, et seq.

The end support bearings further promote structural rigidity (anti-flex or bend of the individual spool bar portions at the intermediate chain drive location), as well as retarding wear of both the bearings and the spool bars. As also previously discussed, it is envisioned that other types of end support bearings can be employed, these including varying sized (i.e. varying diameter) cylindrical shaped inserts for seating within the open annular interior of the spool bar portion. Other features of the end bearings include end surface (radially outwardly) extending flanges, these abutting against the annular end faces of the spool portions and which typically include inner seating aperture for supporting the bearing upon locations of the spool bar rotating chain drives (such as further including three chain drives associated with both ends and intermediate location of the egg conveyor interior.

Referring now to FIG. 12, a perspective view is shown at 162 of a modified spool bar portion exhibiting a coiled spring spool configuration, this in substitution of a rubberized spool bar construction previously described. As shown, the overall spool bar portion is created by a one or more individual and end-to-end connected coil portions, this in order to create an elongated configuration which establishes the desired number (e.g. nine) of individual egg roll lanes.

The coiled spring configuration of the spool bar provides similar dynamic handling characteristics for the eggs being translated, and further can introduce a spring-like deflection to each egg as it is transported between succeeding spool bar portions. As further shown in FIG. 12, the modified spool bar portion 162 is mounted at opposite ends to each of the identified chain drives (intermediate) 146 and (right outer) 148, such as again through the provision of the end support bearings 158 and/or associated rubber wheel drive assemblies (see as shown at 164), these typically being affixed or otherwise frictionally seated within the opposing ends of the spool bar portions according to any of the illustrated embodiments.

Figure 13:
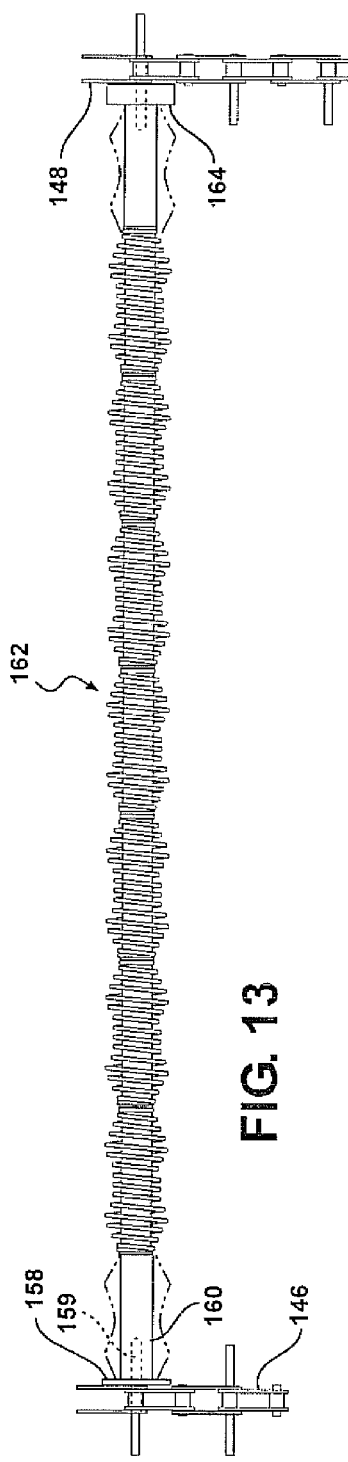
FIG. 13 is an enlarged and overhead plan view of the arrangement shown in FIG. 12 and illustrating the selected end to intermediate engagement established by the selected spool bar portion.

Finally, FIG. 13 is an enlarged and overhead plan view of the arrangement shown in FIG. 12, and further illustrates the selected end to intermediate engagement (at 146) established by the selected (curled wire) spool bar 162. Of note, the opposite and outermost end extending portions of the coiled spring are removed, this in order to more clearly illustrate the manner in which the spool bar portion 162 is secured to the intermediate chain drive 146 and selected (right) outermost extending chain drive 148.

Having described our invention, additional preferred embodiments will become apparent to those skilled in the art to which it pertains, and without deviating from the scope of the appended claims.

We claim:

1. An egg transfer mechanism incorporated within an egg transfer assembly, comprising:

a body supporting a plurality of spool bars arranged in parallel extending and spaced apart fashion between sides of said body and defining a number of individual egg conveying lanes between an inlet and an outlet of said body;

each of said spool bars further comprising at least first and second spool bar portions secured in end-to-end fashion to said sides so as to establish an overall width extending dimension; and first and second chain drives arranged at opposite ends of said spool bar portions proximate said sides, a third chain drive arranged within an intermediate width location of said body parallel to said first and second chain drives, said third chain drive supported by an underside and longitudinally extending brace which is in turn fixedly supported along a width extending interior of said body, said third chain drive supporting opposing and intermediate engaging ends of each pair of spool bar portions;

said third chain drive inheriting the structural supporting aspects of said brace thereby preventing sagging of said intermediate and rotating engaging spool bar portions.

2. The invention as described in claim 1, each of said spool bar portions further comprising an end configuration which, when engaged with a selected chain drive, maintains an equal spacing between dedicated egg conveying lanes.

3. The invention as described in claim 1, further comprising a wear resistant and friction reducing bearing secured to each extending end of said spool bar portions and assisting in rotationally interconnecting said spool bars with rotatable pins associated with said first, second and third chain drives.

4. The invention as described in claim 1, said spool bar portions each exhibiting a specified shape and size and defining up to nine individual egg conveying lanes, such that a selected end-to-end connected pair of spool bar portions provide up to eighteen individual egg conveying lanes.

5. The invention as described in claim 1, said spool bar portions each exhibiting a specified shape and size and further comprising a rubberized configuration defining alternating increased and decreased diameter locations.

6. An egg transfer mechanism incorporated within an egg transfer assembly, comprising:

a body supporting a plurality of spool bars arranged in parallel extending and spaced apart fashion between sides of said body, each of said spool bars further comprising at least first and second spool bar portions secured in end-to-end fashion to said sides so as to establish an overall width extending dimension;

said spool bars each further exhibiting a wound spring coil configuration extending along individual lengths thereof relative to a width of said body, said coiled configuration defining alternating increased and decreased diameter locations in continuously spiraling fashion such that said plurality of spaced apart spool bars establish a plurality of individual egg conveying lanes between an inlet and outlet of said body;

first and second chain drives arranged at opposite ends of said spool bar portions proximate said sides, a third chain drive arranged within an intermediate width location of said body parallel to said first and second chain drives, said third chain drive supported by an underside and longitudinally extending brace which is in turn fixedly supported along a width extending interior of said body, said third chain drive supporting opposing and intermediate engaging ends of each pair of spool bar portions;

said third chain drive inheriting the structural supporting aspects of said brace thereby preventing sagging of said intermediate extending and rotating engaging spool bar portions.

7. The invention as described in claim 6, each of said spool bar portions further comprising an end configuration which, when engaged with a selected chain drive, maintains an equal spacing between dedicated egg conveying lanes.

8. The invention as described in claim 6, further comprising a wear resistant and friction reducing bearing secured to each extending end of said spool bar portions and assisting in rotationally interconnecting said spool bars with rotatable pins associated with said first, second and third chain drives.

9. The invention as described in claim 6, said spool bar portions each exhibiting a specified shape and size and defining up to nine individual egg conveying lanes, such that a selected end-to-end connected pair of spool bar portions provide up to eighteen individual egg conveying lanes.

10. The invention as described in claim 6, said spool bar portions each exhibiting a specified shape and size and further comprising a rubberized configuration defining alternating increased and decreased diameter locations.

\* \* \* \* \*